United States Patent [19]

Asztalos

[11] 4,360,362

[45] Nov. 23, 1982

[54] VALVE CONTROL OF AN ADSORPTION PROCESS

[75] Inventor: Stefan Asztalos, Munich, Fed. Rep. of Germany

[73] Assignee: Linde Aktiengesellschaft, Wiesbaden, Fed. Rep. of Germany

[21] Appl. No.: 311,827

[22] Filed: Oct. 16, 1981

[30] Foreign Application Priority Data

Oct. 28, 1980 [DE] Fed. Rep. of Germany ....... 3040495

[51] Int. Cl.³ ............................................. B01D 53/04
[52] U.S. Cl. .......................................... 55/21; 55/25; 55/163
[58] Field of Search ................... 55/18, 21, 25, 26, 62, 55/68, 74, 75, 161, 163, 179, 387, 389

[56] References Cited

U.S. PATENT DOCUMENTS

| | | | |
|---|---|---|---|
| 2,919,764 | 1/1960 | Dillman et al. | 55/62 X |
| 3,448,561 | 6/1969 | Seibert et al. | 55/62 X |
| 3,477,206 | 11/1969 | Russell | 55/62 |
| 3,636,679 | 1/1972 | Batta | 55/26 |
| 3,986,849 | 10/1976 | Fuderer et al. | 55/25 |
| 4,070,164 | 1/1978 | Miwa et al. | 55/26 |
| 4,197,095 | 4/1980 | White, Jr. et al. | 55/21 X |
| 4,205,967 | 6/1980 | Sandman et al. | 55/21 |
| 4,234,322 | 11/1980 | De Meyer et al. | 55/18 |
| 4,299,595 | 11/1981 | Benkmann et al. | 55/21 |
| 4,315,759 | 2/1982 | Benkmann | 55/18 |
| 4,322,223 | 3/1982 | Christel, Jr. | 55/62 X |
| 4,322,228 | 3/1982 | Myers et al. | 55/163 |

FOREIGN PATENT DOCUMENTS 2624346 12/1977 Fed. Rep. of Germany .......... 55/25

Primary Examiner—Robert H. Spitzer
Attorney, Agent, or Firm—Millen & White

[57] ABSTRACT

An apparatus and process for controlling the opening and closing of valves in lines interconnecting a plurality of adsorbers in a cyclically operating pressure-swing adsorption apparatus includes a common pneumatic signal line associated with all the valves of a single line. An electrical signal supply provides an electronic signal to a current-pressure transducer for converting the electronic signal to a pneumatic signal transmitted through the common pneumatic signal line. Transmission of the pneumatic signal to the valves is controlled by three-way magnetic valves which are operated by a computer which transmits an on-off digital signal to each three-way valve. According to the digital signal transmitted by the computer, each three-way valve will either allow said pneumatic signal to be transmitted to a respective valve associated therewith for causing the valve to open, or prevent the pneumatic signal from affecting the respective valve thus maintaining it closed.

7 Claims, 2 Drawing Figures

VALVE CONTROL OF AN ADSORPTION PROCESS

BACKGROUND OF THE INVENTION

This invention concerns a cyclically operating pressure-swing absorption apparatus and process for purifying and separating gases by operating a plurality of adsorbers having their respective intake ends connected to a raw gas line, and their respective exhaust ends connected to the product gas line by means of valve controlled pipelines. The adsorbers are also mutually interconnected through valve-equipped pressure balancing lines or purge lines.

This invention is particularly applicable to pressure-swing adsorption processes having up to 12 adsorbers for purifying and decomposing gases, e.g., German Offenlegungsschrift No. 26 24 346. In the prior art apparatus six valves are used to control each adsorber, with two valves operating as simple on-off valves (intake and exhaust valves), and four operating as control valves for the different operating stages.

In the prior art process, raw gas passes through an intake valve into an adsorber wherein the more easily adsorbed components are retained, and the components which are more difficult to adsorb leave the apparatus as the product gas flow through an exhaust valve. The adsorption stage occurs at a higher pressure, and is followed by several expansion stages by means of which the product gas and the adsorbed components located in the interstices of the adsorbent are released. The first expansion steps are carried out by a pressure-balancing process, through the corresponding control valves with other adsorbers at lower pressures which are thereby raised to a specified higher pressure. The gas obtained in the last expansion stage of each adsorber is evacuated as the residual gas. This process stage in each adsorber is followed by a counterflow purging for the purpose of removing all adsorbed components from the adsorbent. Finally, several pressure build-up steps occur primarily by means of pressure balancing through control valves with other adsorbers at higher pressures, wherein the last pressurization to the adsorption pressure occurs through the intake valve by using a partial flow of the product gas.

The period of time in operation is often only a few seconds. Thus, the type of control valves used are extremely important for the purpose of achieving such short operational times. Each of these valves is controlled by respective individual electrical signal. More specifically, involved are in analog current signal source, an electrical signal line for analog current signals, and transducer means for converting the electrical analog current signals into pneumatic signals for the purpose of controlling the operation of the pneumatic valves. As applied to the prior art conventional 9-bed pressure varying adsorption apparatus having 36 control valves, such a solution requires that 36 of the above-described device combinations be provided for controlling the opening and closing of all of the valves. This results in increased costs and a high probability of operational defects.

SUMMARY OF THE INVENTION

It is therefore an object of the present invention to provide an economical and simple control means for valves in a pressure-swing adsorption apparatus.

It is also an object to provide a simplified control process for pressure-swing adsorption process.

Upon further study of the specification and appended claims, further objects and advantages of this invention will become apparent to those skilled in the art.

In accordance with the invention a common electrical signal source and a common pneumatic signal line are provided for all the control valves located in each individual pressure balancing line. More commonly, the electrical signal source will be obvious to those skilled in the art. For a more detailed description of this type of device see the *Chemical Engineers Handbook* Perry & Chilton 5th Ed., Chapter 22, specifically §100.

Thus, the apparatus of the invention no longer requires respective individual electrical signal sources and individual pneumatic signal lines for opening and closing each individual value. Instead, a common electrical signal source and operatively associated common pneumatic signal line is provided for all of the control valves for each single pressure balancing line. In the case of a 9-bed pressure swing adsorption apparatus having 9 control valves in each of the three pressure balancing lines and the residual gas line, the invention requires that only one device of the invention be provided per line, i.e., 4 device combinations instead of 36. As a result, the costs as well as the probability of defects occurring are substantially lower than in the prior art.

The apparatus of the invention offers another advantage in that the control valves can be closed substantially faster than in the apparatus of the prior art because the valves are controlled through a single pneumatic signal line. To close the valves, a pneumatic signal line is connected to a setting control device, and the pressure in the line is controlled by means of respective three-way magnetic valves normally maintaining the pneumatic pressure acting on each valve at 0 bar for maintaining each valve closed.

In one embodiment of the invention, the signal source consists of an analog current signal supply, and a current-pressure transducer. The analog current signal supply provides a variable current signal, e.g., of 4 to 20 mA which is converted in the current-pressure transducer into a pneumatic signal of 0.2 to 1.0 bar.

In another embodiment of the invention, each control valve is provided with a pneumatic drive, a pneumatic positioner manufacture by Foxboro, Honeywell, Hartmann, Braun, et al., a three-way magnetic valve and a switch, preferably a digital output actuated switch, and the switches each being respectively connected to a process-computer. In this case, the analog current signal supply may be connected to the process-computer and provides an analog current output upon being activated by the computer.

The opening and closing of the valves is controlled by a variable current analog signal, the signal input of the positioner is connected through the three-way magnetic valve to the common pneumatic signal line, and the current circuit of the three-way magnetic valve is controlled by the digital signal output of the process computer. As a result, the pressure in the pneumatic signal line acts on the input of the positioner which ensures that the valve is opened in the desired manner. If a valve is to be closed, the current circuit of the three-way magnetic valve must be interrupted by the digital output signal from the process computer to cause the three-way magnetic valve to change position and therefore, the pneumatic signal input line of the positioner is completely evacuated to the ambient pressure.

The control apparatus of the invention makes possible high sealing effectiveness and very rapid opening or closing of the control valves. Having described the objects and various features of the control system, the invention will be explained in greater detail below with reference to the drawings.

DETAILED DISCUSSION OF THE INVENTION

Figure 1:
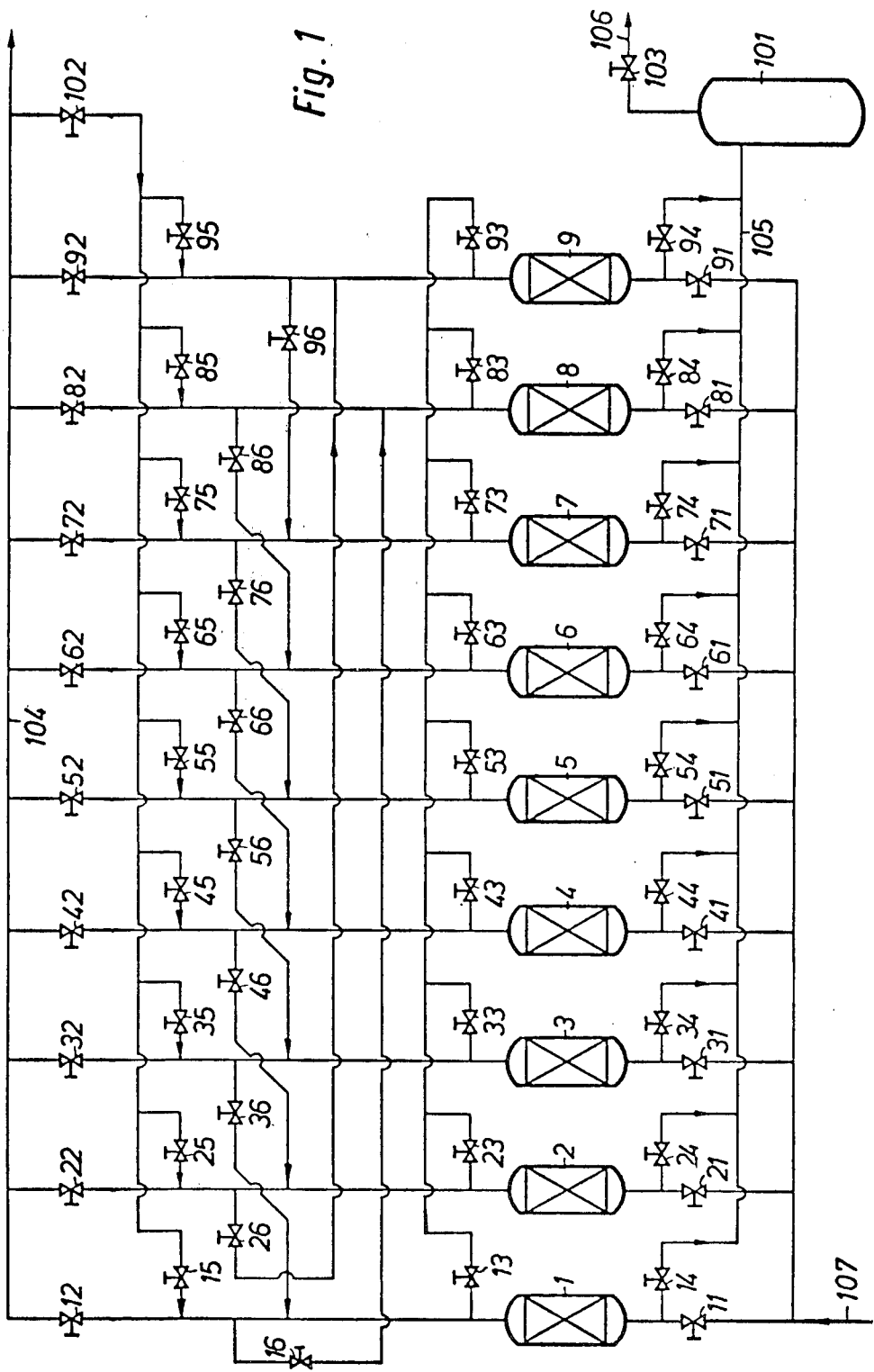
FIG. 1 is a schematic diagram of the pressure-swing adsorption facility of the invention.

The apparatus shown in FIG. 1 comprises nine adsorbers designated by the numbers 1 through 9, having valves 11 through 16 associated with adsorber 1, valves 21 through 26 associated with adsorber 2, and on through valves 91 through 96 associated with adsorber 9. The respective valves 13 through 16, 23 through 26, etc. are control valves. A balancing vessel 101 is provided at the end of line 105. Likewise, lines 104, 106 and 107 are also associated with the apparatus of the invention.

In operation, the raw gas passes through the line 107 and the valve 11 into the adsorber 1. The easily adsorbed components are retained in adsorber 1, while the less easily adsorbed components are removed from the apparatus through the valve 12 and the line 104. After adsorption is completed, the raw gas flow is switched to another adsorber, i.e., absorber 9 through valve 91 and 92, and the pressure in adsorber 1 is lowered to a first intermediate pressure. This is accomplished by a pressure balancing step performed with adsorber 5 by opening the valves 13 and 53. Immediately thereafter, the pressure in the adsorber 1 is lowered to a second intermediate pressure, i.e., by a pressure balancing with the adsorber 6 through the valves 13 and 63 with valve 53 having been closed. During the two pressure drops in the adsorber 1, with gas flow in the direction of the flow of adsorption, the pressure is raised in the two adsorbers 5 and 6. At this time the pressure in the adsorber 1 is further lowered by opening the valves 16 and 84. In the process, the purging gas from the adsorber 1 flows through the adsorber 8 which is thereby purged countercurrently, of previously adsorbed components. The resulting gas mixture passes through the line 105 into the balancing vessel 101.

The valve 84 is then closed and a final pressure balance is achieved between the adsorbers 1 and 8 with the pressure rising in the adsorber 8. Finally, a last pressure drop occurs in the adsorber 1 down to the regeneration pressure, i.e., in counterflow to the direction of the flow of adsorption, by opening the valve 14, whereby the gas flows into the residual gas vessel 101.

To remove the remaining components still present in the adsorbent bed, the adsorber 1 is purged at a lower pressure. In the purging stage, residual (purging) gas is passed from the adsorber 3 through the opening of the valve 36 into the adsorber 1, and the gas mixture so obtained is passed through the opening of the valve 14 into the residual gas line 105.

The increase in pressure in the adsorbers following the purging is implemented in four steps. Initially, adsorber 1 is brought into pressure balance with adsorber 3 by closing the valve 14, while the valve 36 remains open. A second pressure balancing follows with the adsorber 5 by opening valves 53 and 13. Subsequently, the adsorber 6 is brought into pressure balance with adsorber 1, by opening valve 63 while valve 13 remains open. Simultaneously, part of the product gas flowing through the line 104 is drawn-off by opening the valve 102, and passes through the valve 102 into the adsorber 1 through valve 15. Finally, the connection of adsorber 1 with adsorber 6 is shut-off, and the gas from the line 104 is forced into adsorber 1 until the adsorption pressure is reached.

In this adsorber arrangement, the three lines having the resprective control valves 13, 23, 33 . . . etc. 15, 25, 35 . . . etc. and 16, 26, 36 . . . etc. are pressure balancing lines, and the line having the control valves 14, 24, 34 is a residual gas line.

Figure 2:
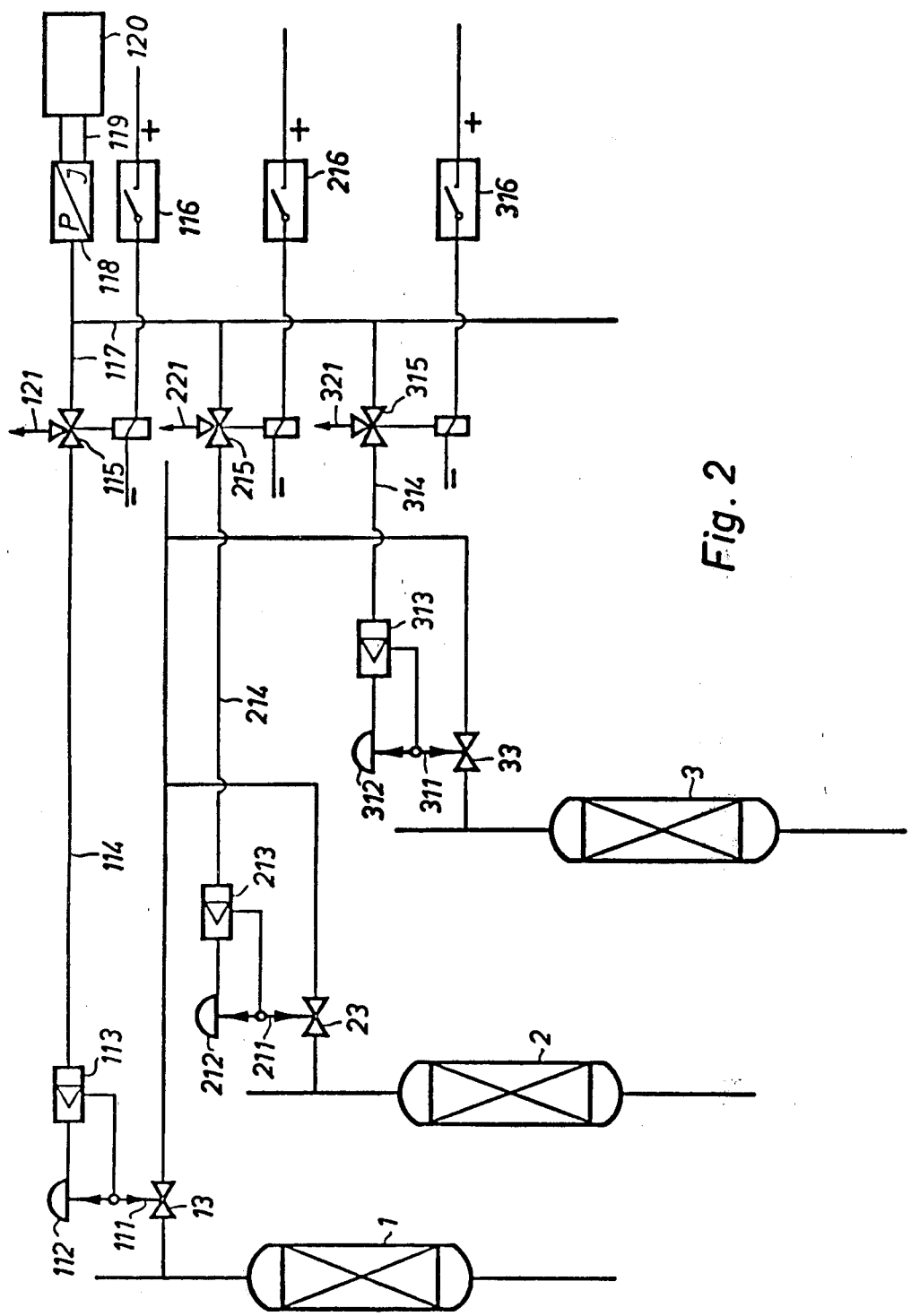
FIG. 2 is a schematic diagram of the control equipment for the valves of a pressure balancing line similar to those of FIG. 1.

FIG. 2 shows the control system of the invention for the valves 13, 23, 33 . . . etc. of one of the pressure balancing lines. The control system for the control valves of each of the other pressure balancing lines is correspondingly similar.

The valve 13 is connected by means of a valve stem 111 to a pneumatic drive means 112, e.g., a diaphragm and by means of a pneumatic signal line 114 to a three-way magnetic valve 115. A positioner 113 is associated with the pneumatic drive means 112 and the stem 111 for regulating the amount that valve 13 is opened. Correspondingly, valve 23 is connected by a valve stem 211 with a pneumatic drive means 212 and through a pneumatic signal line 214 to a three-way magnetic valve 215. The connection of valve 33 is the same as described above with stem 311, positioner 313, line 314, and magnetic valve 315.

The three-way magnetic valves 115, 215, 315 in turn are each connected to a solenoid and respective electric lines having respective switches 116, 216 and 316. The switches are preferably digital output type switches, and are connected to a process computer. Additionally, the three-way magnetic valves 115, 215 and 315 are connected by means of a common signal line 117 to a current-pressure transducer 118 which in turn is connected through an electrical signal line 119 to an analog signal current generator 120.

The analog signal current generator 120 provides a signal current of 4 to 20 mA. This signal is converted in the current-pressure transducer 118 into a pneumatic signal of about 0.2 to 1.0 bar transmitted through line 117. Thus, for example, if the analog current generator 5 supplies a current of 12 mA then this current is converted in the current-pressure transducer 118 into a signal of 0.6 bar, whereby the control valve 13 is caused to open to 50% of its maximum opening.

The solenoid associated with the magnetic valve 115 then receives a digital signal, corresponding to a "circuit closed" condition, from the process computer through the switch 116, then the solenoid will actuate the magnetic valve 115 which then switches on to allow a transmission from line 117 to signal line 114, and the pressure increases through line 114 and acts on the positioner 113. This signal forces the positioner 113 to increase the pressure in the pneumatic drive 112 and opens the control valve 13 by means of the valve stem 111. Subsequently, if the digital signal corresponding to a "circuit open" condition arrives from the process computer through the switch 116, the three-way magnetic valve 115 will be inactivated, the signal line 114 of the positioner will be evacuated into line 121, and the control valve 13 will be closed.

The operation of the control valves 23 and 33 is similar.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a cyclically operated pressure-swing adsorption apparatus for purifying and separating gases wherein a plurality of adsorbers are connected at their respective intakes to a raw gas supply line, the exhaust ends thereof are connected through respective valves to a product gas line, and the adsorbers are interconnected by plural common purge gas lines through a respective plurality of valves for allowing gas to flow between the adsorbers, the improvement comprising:

said valves being pneumatically actuated valves, and wherein a single pneumatic control line having pneumatic control means is connected to all the valves of one of said plural common purge gas lines for providing an individual pneumatic control signal to each one of the valves in each purge line for controlling the opening and closing thereof, and electronic signal control means connected to said pneumatic control means for electronically controlling the operation of all the valves.

2. An apparatus as in claim 1 wherein said electronic signal control means comprises an analog power supply, and said pneumatic control means comprises a current-pressure transducer.

3. An apparatus as in claim 1 further comprising respective drive means for opening and closing each valve, setting control means associated with each drive means for controlling the opening of each valve by each drive means, and a switch controlled three way magnetic valve for each valve for controlling the pneumatic pressure transmitted to said drive means and setting control means for controlling the opening and closing of each valve.

4. An apparatus as in claim 3 wherein said switch controlled three way magnetic valves are adapted to be actuated by a digital signal.

5. An apparatus as in claim 4 further comprising a computer for supplying said digital signal.

6. An apparatus as in claim 2 wherein said analog power supply is connected to and controlled by a computer for supplying an analog current output to said current-pressure transducer.

7. In a method of cyclically operating a pressure-swing adsorption apparatus for purifying and separating gases wherein a plurality of adsorbers are connected at their respective intakes to a raw gas supply line, the exhaust ends thereof are connected through respective valves to a product gas line, and the adsorbers are interconnected by plural common purge gas lines through a respective plurality of valves allowing gas to flow between the adsorbers, the improvement comprising a method of controlling said valves wherein a single pneumatic control line having pneumatic control means is provided for all the valves in each purge line for controlling the opening and closing thereof, the improved method steps comprising:

transmitting an electronic control signal to the pneumatic control means for causing said pneumatic control means to transmit a pneumatic signal through said signal pneumatic control line to the valves associated with the purge line, individually controlling the transmission of said pneumatic signal to each one of said valves by means of electromagnetic control valves operatively associated with a computer, and located respectively between said single pneumatic control line and each valve, by transmitting respective individual on or off signals from said computer to the respective electromagnetic control valves for transmitting or cutting off said pneumatic signal to each one of said valves for specifically changing the condition of each one of the respective electromagnetic control valves.

* * * * *